Aug. 23, 1966  KIYOSHI INOUE  3,268,705
METHOD OF AND APPARATUS FOR THE COATING
AND FINISHING OF METALLIC SURFACES
Filed Aug. 13, 1963  2 Sheets-Sheet 2

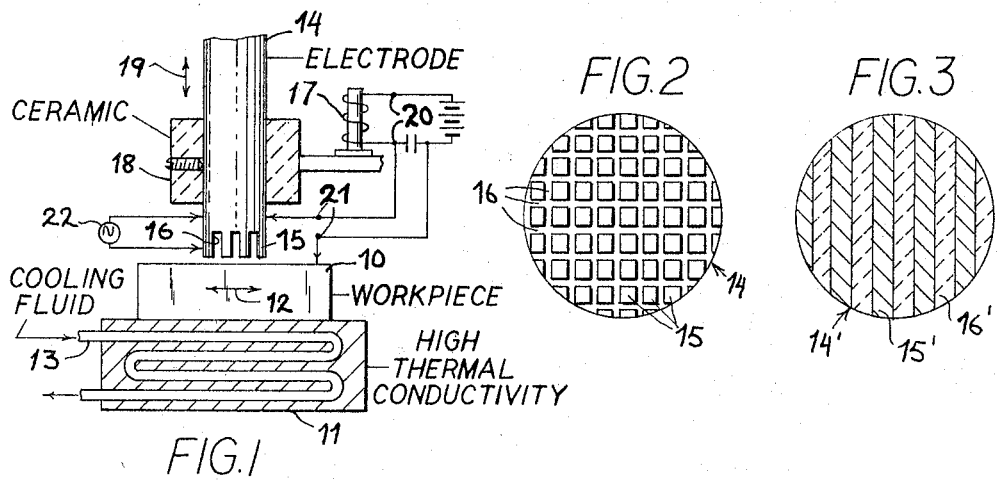

KIYOSHI INOUE
INVENTOR.

BY Karl F. Ross

AGENT

3,268,705
METHOD OF AND APPARATUS FOR THE COATING AND FINISHING OF METALLIC SURFACES
Kiyoshi Inoue, 182 3-chome, Tamagawayoga-machi, Setagava-ku, Tokyo-to, Japan
Filed Aug. 13, 1963, Ser. No. 301,778
5 Claims. (Cl. 219—76)

My present invention relates to the coating of metal surfaces with the aid of spark-discharge deposition of metal from an electrode and to the finishing of surfaces so deposited. This application is directed to improvements in the systems disclosed in my U.S. Patent No. 3,098,150, issued July 16, 1963.

In the aforementioned patent, I disclose and claim a method of coating metallic surfaces, as well as an apparatus for carrying out this method, which constitutes a significant improvement in the art of spark-discharge treating of workpiece surfaces. Heretofore, the art, represented for example by U.S. Patent No. 2,796,509 to Blake, employed spark-discharge primarily for the electo-erosion of metallic surfaces. I, however, have discovered that it is possible to utilize spark-discharge in a completely different manner. In my improved method, an electrode is repeatedly urged into contact with a workpiece, thereby drawing a spark therefrom and creating at least a partial weld between the electrode and the workpiece. Preferably, electromagnetic means is mounted upon a support and is operable, upon contact of the electrode with the workpiece, to draw the electrode abruptly away from the workpiece in order to break the weld and leave metal from the electrode deposited upon the workpiece. The effectiveness of this operation is believed due to the fact that the workpiece generally has a mass which is much greater than that of the electrode and, therefore, has a larger thermal conductivity. Accordingly, heat is conducted away from the weld on the workpiece side of the region of fusion leaving electrode material firmly adhered to the surface treated. The fused electrode material apparently is readily detached from the body of the electrode as a consequence of the relatively higher temperature thereof. The surface produced in this matter is, depending upon the specific spark-discharge characteristics and rate of deposition, more or less free from surface discontinuities. Occasionally, however, it is desirable to finish the electrode surface by grinding, lapping, polishing or the like. Conventional lapping methods, however, are not always satisfactory since they always require the use of lapping compounds and abrasive materials which cause erosion of the surface coating, such erosion being extremely disadvantageous in cases where the coating thickness is relatively small.

It is the principal object of the present invention to provide improved apparatus for the coating of metallic bodies as well as improved methods of carrying out such coating.

Another object of this invention is to extend the principles first advanced in my aforementioned patent and provide means for effecting an increased rate of spark deposition thereover.

Still another object of this invention is to provide an improved electrode for a surface-coating apparatus of the character set forth in the prior patent.

Yet a further object of this invention is to provide a method of finishing or "lapping" irregular surfaces of the type produced by spark deposition without the aid of lapping compounds or the like as well as an apparatus for carrying out this method.

These objects and others which will become apparent hereinafter are attained, in accordance with the present invention, by providing a method for surface coating a metallic workpiece which includes the step of maintaining the rate of heat conduction on the workpiece side of the fusion zone always greater than the heat conduction on the electrode side of the zone. Thus it is contemplated, according to the invention, to repeatedly drive a body of the material to be deposited, herein termed an electrode, against the workpiece surface to be coated, passing an impulsive current between the electrode and the workpiece to fuse them temporarily or momentarily together, and thereafter, forcibly withdrawing the electrode (e.g., with the aid of electromagnetic means energized upon formation of the weld) to leave a portion of the electrode firmly fused to the workpiece surface. It has now been discovered that this fusion can be expedited and the adhesion of electrode material to the workpiece rather than workpiece material to the electrode can be assured if, during the sequence of operations mentioned above, care is taken to ensure that heat conduction away from the workpiece will always exceed that away from the electrode. Advantageously, these circumstances can be realized when, according to an essential feature of this invention, the electrode has a contact area whose extent is somewhat less than the workpiece area confronting the electrode body. This can be accomplished, according to the invention, with an electrode having a plurality of contact formations positioned in an array whose periphery determines the area of the workpiece affected. These formations are, however, spaced apart by gaps, recesses or regions of low thermal conductivity (relative to the electrode material) so that the actual mass of thermally conductive material immediately adjacent the weld zone on the electrode side of the interface is less than the thermally conductive mass immediately adjacent the workpiece side of this interface.

Furthermore, it has been found that it is possible to obtain excellent results when, in addition to providing an electrode of the type discussed hereinabove, auxiliary means is employed for ensuring greater thermal dissipation at the workpiece than at the electrode. It should be noted, however, that the use of such auxiliary means, in the absence of an electrode of the character described, has also resulted in substantially improved results. According to a more specific feature of this invention, the auxiliary means includes cooling means in heat-exchanging relationship with the workpiece for conducting thermal energy away from the latter at a relatively high rate. The cooling means can, for example, be a body of relatively high thermal conductivity received within the workpiece body. In an extension of this principle, the electrode can be supported by or encased within a material of low thermal conductivity (e.g., a refractory material such as a ceramic substance) whose relatively low thermal conductivity prevents expeditious dissipation of thermal energy from the electrode body. It is also contemplated, according to another specific feature of this invention, to limit thermal dissipation from the electrode body by heating the latter so that an equilibrium is established in the course of which the thermal content of the electrode body will invariably be greater than that of the workpiece.

According to another aspect of this invention, electrical energy in addition to serving as the deposition means for affixing a surface coating to a workpiece body, also effects a lapping or finishing of the surface without the need for abrasive and like polishing means which normally remove surface irregularities by producing less disadvantageous irregularities and eroding portions of the coating.

According to this latter aspect of the invention, surface finishing is carried out by rolling a generally cylindrical smoothing surface along the coated surface of the workpiece and passing an electric current between the workpiece and the roller while applying pressure in the radial direction of the roller to force the latter against the workpiece surface. Normally it is desirable to have the smoothing roller osculate (i.e., contact with second or higher order) the workpiece surface with line or surface contact the electric contact passing between the roller and the workpiece all along the contact region. When, however, the workpiece surface has irregularities, the roller contacts the workpiece in these regions only at elevated portions of the irregularities, the electric current being concentrated in these regions. This concentration of the electric current is employed to heat the workpiece material (e.g., the deposited coating) to a temperature at or above its temperature of plastic deformation at the pressure applied by the roller. The latter then, in effect, forces the projecting irregularity down so that linear contact between roller and workpiece is reestablished. This combination of pressure and electrical energy to smooth irregular surfaces, especially those deposited by the spark-discharge technique discussed above, provides the possibility of smoothing flat and arcuate surfaces without the use of abrasives and loss of coating material. While the pressure on the roller can be derived from many sources, e.g., hydropneumatic cylinders, resilient means, wedging action or the like, and is thus capable of flattening projecting irregularities in a single pass upon proper elevation of the temperature at the projections, it is generally desirable to displace the roller means over the workpiece surfaces in one or more passes. Thus it is contemplated, according to the invention, to provide a plurality of such rollers upon a common support and to successively displace them over the workpiece surface. The latter can be a flat surface or that of a cylinder, (e.g., the cylinder of a fluid-pressure machine, internal combustion engine, or the like). Alternatively, a single smoothing roller can be provided and its support or that of the workpiece can be repeatedly displaced relative to the other member.

The above and other objects, features and advantages of the present invention will become more readily apparent from the following description, reference being made to the accompanying drawing in which:

FIG. 1 is an elevational view diagrammatically illustrating an apparatus for the spark-discharge coating of a workpiece with an electrode material;

FIG. 2 is a bottom view of the electrode;

FIG. 3 is a transverse cross-sectional view through the tip of an electrode, according to the present invention;

FIG. 4 is a transverse cross-sectional view schematically illustrating an apparatus for the coating of cylindrical workpieces;

FIG. 5 is an elevational view diagrammatically illustrating a method for lapping flat workpiece surfaces according to this invention;

Figure 6:
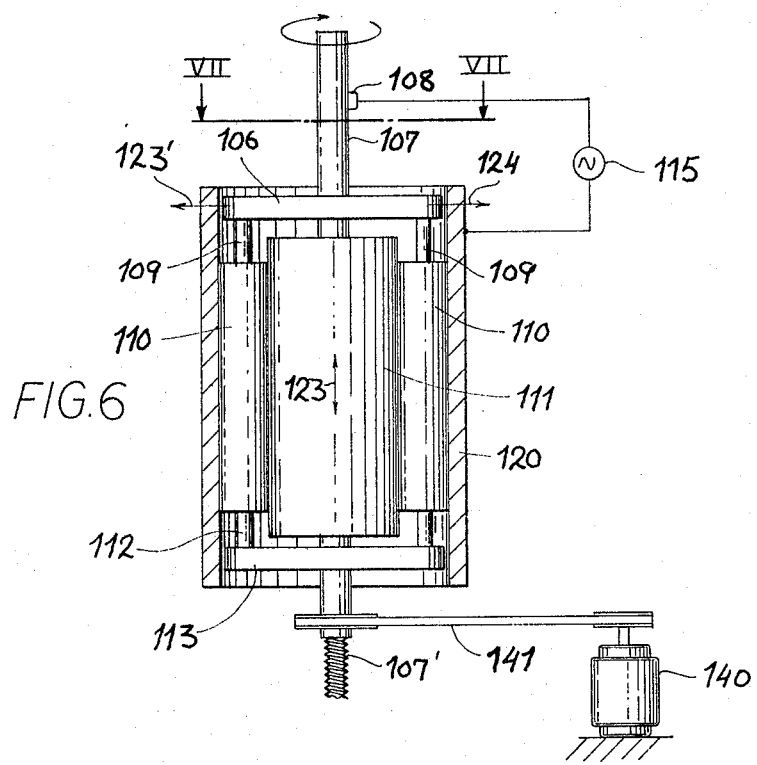
FIG. 6 is an axial cross-sectional view, partly in elevation, showing apparatus for lapping a cylinder in accordance with this technique.

In FIG. 1 I show a workpiece 10, which can be a blanking die of a material such as steel to be coated with a relatively hard surfacing layer of tungsten carbide, mounted upon a table 11 of a material having relatively high thermal conductivity (e.g., aluminum). Through this table 11 there passes a tube 13 for a cooling fluid which is thus in heat-conducting relationship with the workpiece 10. The latter can be displaced in the direction of arrow 12 by suitable cross-slides and the like, well known per se. Juxtaposed with the upper surface 10 of the workpiece is an electrode 14, operable preferably by means identical with that illustrated in my aforementioned copending application, this electrode having projecting formations 15 juxtaposed with the workpiece. Consequently, interstices or recesses 16 are formed between the formations 15, while the coating surface of the electrode has a contact area (equal to the sum of the surface areas of the formations 15) which is less than the surface area of the workpiece with which the electrode is juxtaposed. The electrode 14 can be biased by a spring (not shown) in the direction of the workpiece 10, this spring engaging the electrode via a support block 18 of relatively low thermal conductivity (e.g., ceramic material). An electromagnetic coil 17 can be energized by a source connected to it at 20 for drawing the electrode out of contact with the workpiece after a discharge current, applied at terminal 21, has caused a partial welding of the eelctrode material to the workpiece surface. The ceramic body 18 reduces the rate at which thermal energy is conducted away from the electrode/workpiece interface on the electrode side thereof. The electrode is thus consistently hotter than the workpiece, which is cooled by the fluid introduced through tube 13. Even if this cooling fluid were not used, the high thermal conductivity of block 11 would result in a dissipation of the thermal energy on the workpiece side of the electrode/workpiece interface. The electrode can, additionally, be heated (e.g., by the A.-C. source 22) to reduce the effective dissipation rate on the electrode side of the fusion zone.

*Example I*

A blanking die of SKD metal, having edge angles of 90° with 0.02 mm. corner radius, is disposed in the position of workpiece 10 (FIG. 1). No cooling fluid or electrode heating is employed. The electrode 14 has the configuration shown in FIGS. 1 and 2 and is composed of tungsten carbide. The electrode diameter is 5 mm. and the discharge-fusion current has an intensity of 2 amperes, a coating time of 6 seconds per square mm. being used at 20 volts across the electrode and workpiece. A repetition rate of approximately 2–300 cycles per second was employed. With the indicated treatment time and with an electrode devoid of the formations 15, 16 previously described, a tungsten carbide coating whose thickness was 0.04 mm. was obtained on the workpiece and the corner radiuses became approximately 0.045 mm. The significance of the corner radius is, essentially, connected with the fact that if electrode material does not adhere sufficiently quickly to the workpiece to prevent undue enlargement of the corner radius, the radius increases to limit the effectiveness of the die. This is especially disadvantageous with regard to blanking dies wherein the corner radiuses frequently lie along the cutting edges of the device. When an electrode of identical material and size was provided with formations 15 and 16 by cutting two grooves, each in two mutually orthogonal directions across the face of the electrode, the grooves being of 1 mm. which with a 1 mm. spacing utilization of the same current, treatment time and voltage resulted in a coating thickness of 0.055 mm. and corner radiuses of about 0.025 mm.

*Example II*

When the process of FIG. 1 was carried out with a flatface tungsten carbide electrode, but with an aluminum plate having a thickness of 6 mm. in heat-exchanging relationship with the workpiece, preferably by disposing the aluminum plate in a recess of the workpiece body in the region of the coating electrode, the corner radius became 0.032 mm., again an improvement over systems wherein the necessary precautions were not taken to ensure relatively greater dissipation of heat from the workpiece than from the electrode. Further improvements were noted when the cooling fluid was employed and the electrode was heated.

In FIG. 3 I show another electrode structure wherein the formations 15' of electrode 14' are constituted by individual bars bonded together with intervening layers of a thermally insulating material 16'. These layers preferably include a refractory material of low thermal conductivity such as a ceramic (e.g., $Al_2O_3$). Again this structure is compatible with the use of a cooling fluid, a body of high-thermal conductivity in contact with the workpiece, a body of low-thermal conductivity for supporting the electrode and the use of heating means 22 for elevating the temperature of the latter.

In FIG. 4 I show an apparatus for the spark-discharge coating of internal surfaces and particularly those of hydro pneumatic or internal-combustion engine cylinders. In this case, at least one but preferably a plurality of radially reciprocable electrodes 37 can be displaced in the direction of the interior surface 40 of a cylinder shell 30 by means of a spring 34 received within a support sleeve 33 (e.g., of thermally nonconductive material) a coil 36 being provided to withdraw each of the electrodes from contact with the workpiece. The electrodes 37 are provided with projecting formations 38 spaced by grooves 39 so that the contact area of each electrode is substantially less than the surface area of the workpiece juxtaposed therewith. The support 33 is rotated about its axis and that of the cylinder, the discharge current being supplied across terminal 31. When it is desired to coat the cylinder surface axially as well as circumferentially, carrier 32 can be displaced in axial direction (e.g., via a screw arrangement.)

In FIG. 5 I show an apparatus for finishing the surface of the workpiece coated in the manner described with respect to FIG. 1. The workpiece 105 can be reciprocated in the direction or arrow 105' by any conventional machine-tool feed means, a finishing roller 104 being urged into tangetial contact with the workpiece 105 under pressure from a fluid-operated cylinder 102 via its piston 103. The piston-and-cylinder arrangement illustrated in FIG. 5 is representative of a pair of such devices, the pistons 103 of which act upon bearing block 104' wherein the shaft of roller 104 is journaled. The cylinders 102 of the pressure means are mounted upon a support 100 which, likewise, can be movable in the direction of arrow 100' to the desired degree to maintain the workpiece 105 stationary. This latter arrangement is employed when the workpiece is so massive that its movement would be relatively inconvenient. An alternating current source 105" is connected across the roller 104 and the workpiece 105. As the roller means or the workpiece means are relatively displaced in the direction of arrow 105', 100', contact of roller 104 with surface elevation on the workpiece 105' tends to concentrate the electric current at these irregularities, thereby bringing them into a softened or plastically deformable state, the pressure of piston 103 thus completely eliminates all of the projecting discontinuities upon one or more passes.

In FIG. 6 I show an apparatus for finishing the cylinder of FIG. 4, this apparatus comprising a support shaft 107 carrying a drum 111 and being threadedly received upon a spindle 107' so that the device can be displaced axially as it rotates. Shaft 107 carries a pair of radial arms 106, 113 at axially spaced locations, a plurality of finishing cylinders 110 (only 2 of which are shown) being journaled via respective pins 109, 112 to the arms 106, 113. Each of the pins can, for example, be mounted in a block such as that illustrated at 108', which is guided radially in a slot 106', while a compression spring 122 serves to urge the finishing rollers 110 radially outwardly (arrow 123') against the surrounding cylinder 120, whose inner surface is to be smoothed. An alternating-current source 115 is connected to the rollers 110 via a brush or wiper 108 and to the cylinder 120, as best seen in FIG. 6.

Figure 7:
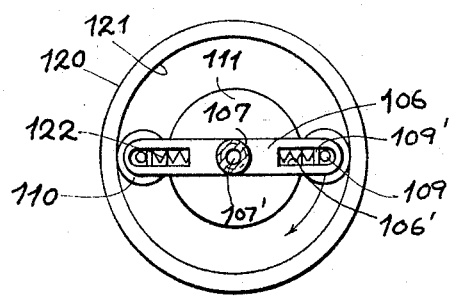
FIG. 7 is a cross-sectional view taken along the line VII—VII of FIG. 6.
Figure 8:
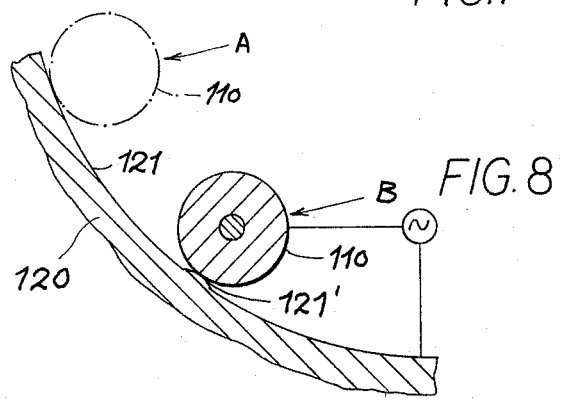
FIG. 8 is a diagram illustrating the lapping process of this invention.

When source 115 is energized and shaft 107 caused to rotate, for example in the clockwise direction (FIG. 7) by a motor 140 and a belt transmission 141, the entire cage of rollers 110 crushes projecting portions of the inner surface of the cylinder 120, especially when these portions have been heated by a concentration of electric current as previously described, the crushing force (in the direction of arrow 123') exerted by spring 122 can be augmented by hydropneumatic means of the type illustrated in FIG. 5. Since the spindle 107' is fixed, shaft 107 tends to shift axially therealong, displacing the fiinishing rollers 110 all along the periphery of the cylinder to complete the lapping operation. To facilitate this axial movement, motor 140 can be provided with a suitable guide rail (not shown). The operation of this device is illustrated diagrammatically in FIG. 8. As each roller 110 (a multiplicity of which can be provided) is displaced along the inner surface 121 of the cylinder 120 from a position A in which the roller 110 osculates the cylinder wall over a generatrix of the latter, into a position B wherein these rollers contact only the projecting portions 121', a concentration of the current at these projecting portions is developed. Since a relatively large current is concentrated over a relatively small contact area, sufficient heat is developed to render the projections plastically deformable, when the radial pressure is considered. The roller 110 thus crushes these projections in such a manner as to again effect contact of the roller along a straight-line generatrix. This construction has been found to be particularly suitable for the finishing of coated internal-combustion-engine cylinders, the pistons whereof evidence substantially reduced wear.

*Example III*

The internal wall of a piston cylinder machined from high-carbon steel and having a length of 120 mm., a diameter of 50 mm. and a surface roughness of 3 microns (maximum entent of projecting discontinuance) was coated with tungsten carbide with the aid of an apparatus similar to that illustrated in FIG. 4 at a discharge voltage of 30 volts, a frequency of 220 cycles per second and a current of 5 amperes (R.M.S.). The inner diameter became 49.88 mm. while the machining temperature was 40° C. (average) at a coating speed of 3 seconds per $mm.^2$, the surface roughness increasing to 45 microns Hmax. A cylinder similar to that shown at 111 and provided with 29 tungsten carbide rollers was forced into the cylinder and rotated at 50 revolutions per minute for 30 seconds, an electric current of approximately 5 amps (R.M.S.) being passed between the roller and the cylinder. The compressive force was on the order of several hundred $kg./cm.^2$. After this surface finishing, a surface roughness of 2 microns Hmax. (maximum depth of roughness cavity or height of microscopic protuberance) was noted, the coating layer having 50 tiny cavities per $cm.^2$ of such size that they were barely perceptible upon microscopic examination. The applied voltage was 1.1 volts and a Vickers hardness of Hv 1400 was obtained for the coated surface. It was observed that, in the absence of the electric current for facilitating the softening of the projecting portion of the surface, a minimum of 3 minutes was required to obtain a similar surface finish.

The invention described and illustrated is believed to admit of many modifications within the ability of persons skilled in the art, all such modifications being considered within the spirit and scope of the appended claims.

I claim:

1. In a method of coating a metallic workpiece by iteratively effecting an impulsive discharge between said workpiece and an electrode composed of a coating material, thereby at least partially welding said electrode to said workpiece at an interfacial region, and forcibly removing said electrode from said workpiece to leave portions of said material fused to said workpiece, the improvement which comprises the step of maintaining the rate of heat conduction away from said region on the workpiece side thereof in excess of that on the electrode side of said region, the rate of heat conduction away from said region on the workpiece side thereof being maintained in excess of that on the electrode side of said region by using an electrode with a contact face juxtaposed with said workpiece whose surface area in contacting relationship with the workpiece is less than the surface area of the corresponding surface of said workpiece confronting said face and within the outline thereof.

2. In a method of coating a metallic workpiece by iteratively effecting an impulsive discharge between said workpiece and an electrode composed of a coating material, thereby at least partially welding said electrode to said workpiece at an interfacial region, and forcibly removing said electrode from said workpiece to leave portions of said material fused to said workpiece, the improvement which comprises the step of maintaining the rate of heat conduction away from said region on the workpiece side thereof in excess of that on the electrode side of said region, the rate of heat conduction away from said region on the workpiece side thereof being maintained in excess of that on the electrode side of said region by heating said electrode independently of said discharge.

3. A method of coating a metallic workpiece, comprising the steps of iteratively effecting an impulsive discharge between said workpiece and an electrode composed of a coating material, thereby at least partially welding said electrode to said workpiece at an interfacial region therebetween, and forcibly removing said electrode from said workpiece to leave portions of said material fused to said workpiece; and eliminating surface projections from the coating thus formed by relatively displacing said workpiece and a roller pressed against said coating in osculating contact with said workpiece at a pressure sufficient to plastically deform said projections, while passing an electric current between said roller and said workpiece to heat said projections.

4. A method of coating a metallic workpiece, comprising the steps of iteratively effecting an impulsive discharge between said workpiece and an electrode composed of a coating material, thereby at least partially welding said electrode to said workpiece at an interfacial region therebetween, and forcibly removing said electrode from said workpiece to leave portions of said material fused to said workpiece, while maintaining the rate of heat conduction away from said region on the workpiece side thereof in excess of that on the electrode side of said region; and eliminating surface projections from the coating thus formed by relatively displacing said workpiece and a roller pressed against said coating in osculating contact with said workpiece at a pressure sufficient to plastically deform said projections, while passing an electric current between said roller and said workpiece to heat said projections.

5. In an apparatus for the discharge coating of a metallic workpiece having an electrode composed of a coating material, means for bringing said electrode and said workpiece into proximity and forming at least a partial weld therebetween, and means for forcibly withdrawing said electrode from said workpiece to leave portions of said material fused to said workpiece, the improvement which comprises means for maintaining the rate of heat conduction away from said weld on the workpiece side thereof in excess of the rate of heat conduction on the electrode side of said weld, said electrode having a contact face juxtaposed with said workpiece whose surface area in contacting relationship with the workpiece is less than the surface area of the corresponding surface of said workpiece confronting said face and within the outline of said contact face, said contact face is formed with a multiplicity of projecting formations extending in the direction of said workpiece, said contact face being provided with grooves intermediate said formations.

References Cited by the Examiner

UNITED STATES PATENTS

| | | | |
|---|---|---|---|
| 1,613,957 | 1/1927 | Madden | 219—117 X |
| 1,620,519 | 3/1927 | Clawson | 219—50 |
| 2,078,746 | 4/1937 | Vasey | 219—50 |
| 2,299,747 | 10/1942 | Harter | 219—76 |
| 2,994,762 | 8/1961 | Todd | 219—76 |
| 3,097,291 | 7/1963 | Adcock | 219—76 |
| 3,098,150 | 7/1963 | Inoue | 219—76 X |

FOREIGN PATENTS 9,782     1887    Great Britain.

ANTHONY BARTIS, *Acting Primary Examiner.*

JOSEPH V. TRUHE, *Examiner.*